US009723281B2

(12) United States Patent
Inoue

(10) Patent No.: US 9,723,281 B2
(45) Date of Patent: Aug. 1, 2017

(54) PROJECTION APPARATUS FOR INCREASING PIXEL USAGE OF AN ADJUSTED PROJECTION AREA, AND PROJECTION METHOD AND PROGRAM MEDIUM FOR THE SAME

(71) Applicant: CASIO COMPUTER CO., LTD., Shibuya-ku, Tokyo (JP)

(72) Inventor: Hideaki Inoue, Musashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 196 days.

(21) Appl. No.: 14/221,897

(22) Filed: Mar. 21, 2014

(65) Prior Publication Data

US 2014/0285777 A1  Sep. 25, 2014

(30) Foreign Application Priority Data

Mar. 22, 2013  (JP) ................................ 2013-060437

(51) Int. Cl.
*H04N 9/31* (2006.01)
(52) U.S. Cl.
CPC ......... *H04N 9/3185* (2013.01); *H04N 9/3179* (2013.01); *H04N 9/3188* (2013.01)
(58) Field of Classification Search
CPC .. G03B 21/147; H04N 9/3185; H04N 9/3179; H04N 9/3182; H04N 9/3188; H04N 9/3191; H04N 9/3194
See application file for complete search history.

(56) References Cited

U.S. PATENT DOCUMENTS

| 7,144,115 | B2 * | 12/2006 | Li | .......................... G03B 21/26 348/E9.027 |
| 7,252,387 | B2 * | 8/2007 | Raskar | .................... H04N 5/74 348/746 |
| 7,303,285 | B2 | 12/2007 | Inoue | |

(Continued)

FOREIGN PATENT DOCUMENTS

| JP | 2001-067015 A | 3/2001 |
| JP | 2003283963 A | 10/2003 |

(Continued)

OTHER PUBLICATIONS

Japanese Office Action (and English translation thereof) dated Dec. 6, 2016 issued in Japanese counterpart Application No. 2013-060437.

*Primary Examiner* — Bao-Luan Le
(74) *Attorney, Agent, or Firm* — Holtz, Holtz & Volek PC

(57) ABSTRACT

In a projector, a comparator included in a trapezoid correction unit compares the aspect ratio of a rectangular input unit with that of the device area. A projection area determination unit determines an effective projection area that is an area included in the projection area and that is rectangular on the object on the basis of a result of the comparison. The device area determination unit determines an effective device area so that the relation of the effective projection area with the projection area corresponds to the relation of the effective device area with the device area. A geometric transformation unit projects the input image into the effective device area so that the input image is projected without distortion within the effective projection area of the object.

8 Claims, 17 Drawing Sheets

(56) References Cited

U.S. PATENT DOCUMENTS

| | | | |
|---|---|---|---|
| 7,352,913 B2* | 4/2008 | Karuta | G02B 27/0025 |
| | | | 348/746 |
| 7,909,470 B2 | 3/2011 | Yonezawa | |
| 8,573,780 B2 | 11/2013 | Ishii | |
| 2003/0043303 A1* | 3/2003 | Karuta | G02B 27/0025 |
| | | | 348/744 |
| 2003/0223048 A1 | 12/2003 | Kimura | |
| 2005/0231691 A1* | 10/2005 | Li | G03B 21/26 |
| | | | 353/69 |
| 2006/0209268 A1* | 9/2006 | Raskar | H04N 5/74 |
| | | | 353/69 |
| 2009/0027629 A1 | 1/2009 | Yonezawa | |

FOREIGN PATENT DOCUMENTS

| | | |
|---|---|---|
| JP | 2004032484 A | 1/2004 |
| JP | 2005-051577 A | 2/2005 |
| JP | 2007214701 A | 8/2007 |
| JP | 2008-103978 A | 5/2008 |
| JP | 2011-139179 A | 7/2011 |

* cited by examiner

PROJECTION APPARATUS FOR INCREASING PIXEL USAGE OF AN ADJUSTED PROJECTION AREA, AND PROJECTION METHOD AND PROGRAM MEDIUM FOR THE SAME

BACKGROUND

1. Technical Field

The present invention relates to a projection apparatus, a projection method, and a program medium for projection.

2. Related Art

There is generally known a projector that is an image projection apparatus that projects an image based on image data output from a personal computer or the like onto a projection target such as a screen.

When such a projector is placed, a projection area of the projector on the projection target such as a screen is adjusted first.

For example, JP 2001-067015 A discloses the use of an adjustment chart for such adjustments of a projection area.

There are various methods for the adjustments of a projection area. Different methods for adjusting a projection area result in different pixel usages of a projection apparatus. Typically, projection with higher brightness and higher resolution is realized as the pixel usage is higher.

SUMMARY

It is therefore an object of the present invention to provide a projection apparatus, a projection method, and a program medium for projection capable of adjusting a projection area with high pixel usage.

To achieve the aforementioned and other objects, an aspect of the present invention provides a projection apparatus including: a projection optical system configured to project projection light having a projection area onto an object; an output display device having a rectangular device area and configured to modulate the projection light to generate a projection image; a comparator configured to compare an aspect ratio of a rectangular input image input as an image to be projected with an aspect ratio of the output display device; a projection area determination unit configured to determine an effective projection area that is an area included in the projection area and that is rectangular on the object on the basis of a result of the comparison; a device area determination unit configured to determine an effective device area so that the relation of the effective projection area with the projection area corresponds to the relation of the effective device area with the device area; and a geometric transformation unit configured to project the input image into the effective device area so that the input image is projected without distortion within the effective projection area of the object.

To achieve the aforementioned and other objects, another aspect of the present invention provides a projection method including: comparing an aspect ratio of a rectangular input image input as an image to be projected with an aspect ratio of an output display device having a rectangular device area and configured to modulate the projection light having a projection area and projected onto an object to generate a projection image; determining an effective projection area that is an area included in the projection area and that is rectangular on the object on the basis of a result of the comparison; determining an effective device area so that the relation of the effective projection area with the projection area corresponds to the relation of the effective device area with the device area; and projecting the input image into the effective device area so that the input image is projected without distortion within the effective projection area of the object.

To achieve the aforementioned and other objects, another aspect of the present invention provides a non-transitory computer readable recording medium having a program causing a computer to execute: comparing an aspect ratio of a rectangular input image input as an image to be projected with an aspect ratio of an output display device having a rectangular device area and configured to modulate the projection light having a projection area and projected onto an object to generate a projection image; determining an effective projection area that is an area included in the projection area and that is rectangular on the object on the basis of a result of the comparison; determining an effective device area so that the relation of the effective projection area with the projection area corresponds to the relation of the effective device area with the device area; and projecting the input image into the effective device area so that the input image is projected without distortion within the effective projection area of the object.

DETAILED DESCRIPTION

An embodiment of the present invention will be described with reference to the drawings.

A projection apparatus according to the present embodiment employs digital light processing (DLP) (registered trademark) using a micromirror display device.

Figure 1:
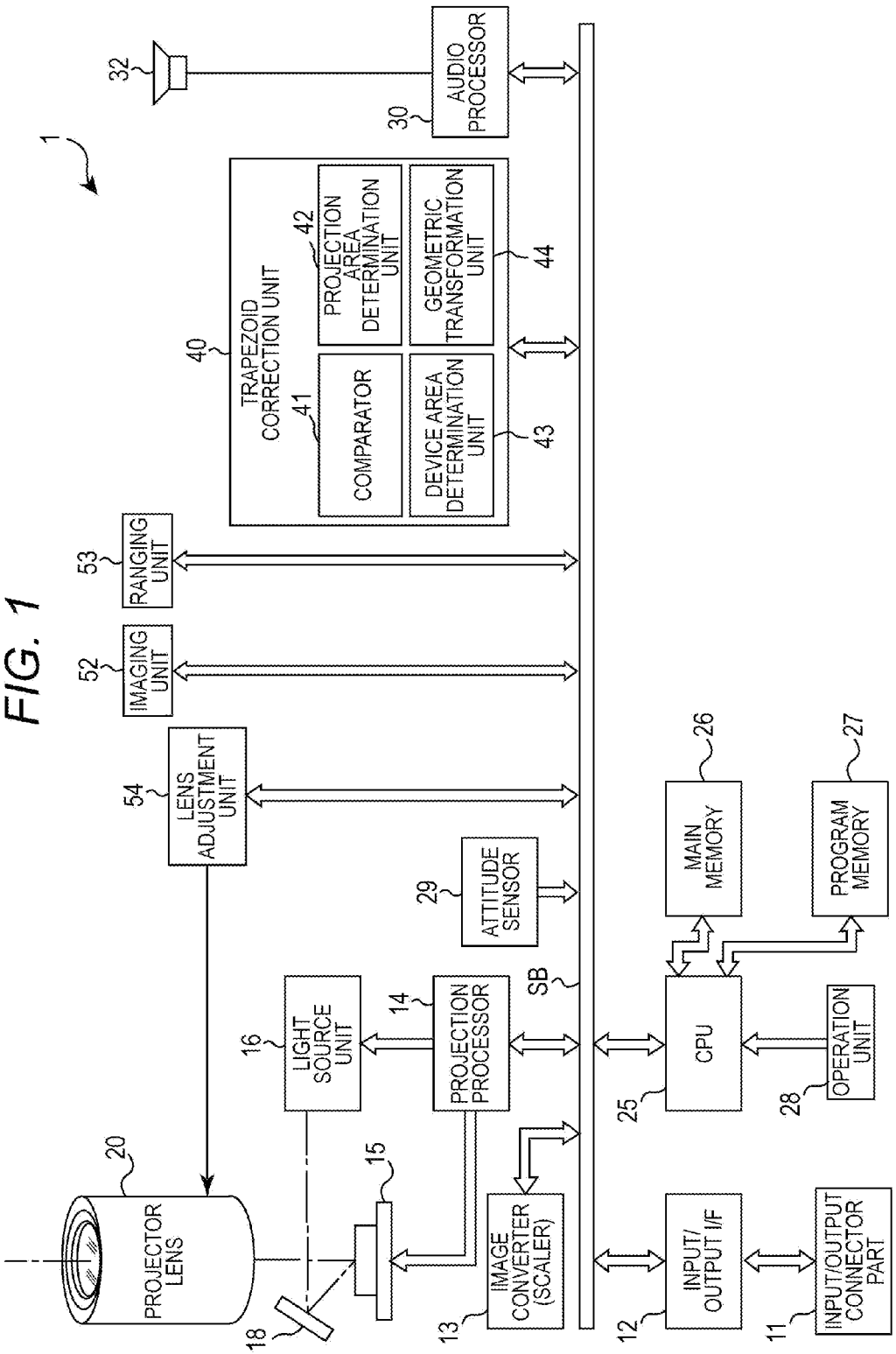
FIG. 1 is a block diagram illustrating an exemplary configuration of a projector that is a projection apparatus according to a first embodiment.

FIG. 1 illustrates an outline of a configuration of a projector 1 that is a projection apparatus according to the present embodiment. The projector 1 includes an input/output connector part 11, an input/output interface (I/F) 12, an image converter 13, a projection processor 14, a micromirror device 15, a light source unit 16, a mirror 18, a projector lens 20, a CPU 25, a main memory 26, a program memory 27, an operation unit 28, an attitude sensor 29, an audio processor 30, a speaker 32, a trapezoid correction unit 40, an imaging unit 52, a ranging unit 53, a lens adjustment unit 54, and a system bus SB.

The input/output connector part 11 is provided with terminals such as a pin-jack (RCA) video input terminal and a D-sub 15 RGB input terminal, and receives analog image signals as input. The input image signals are input to the image converter 13 via the input/output interface 12 and the system bus SB. Input analog image signals of various standards are converted into digital image signals.

The input/output connector part 11 may also be provided with an HDMI (registered trademark) terminal or the like and receive digital image signals as input in addition to analog image signals.

The input/output connector part 11 also receives audio signals that are analog or digital signals as input. The input audio signals are input to the audio processor 30 via the input/output interface 12 and the system bus SB.

The image converter 13 is also referred to as a scaler.

The image converter 13 converts input image data to adjust the resolution and the gradation thereof to generate image data in a predetermined format suitable for projection. The image converter 13 sends the converted image data to the projection processor 14. Where necessary, the image converter 13 sends image data obtained by superimposing a symbol indicating any of various operation states for on-screen display (OSD) as processed image data to the projection processor 14.

The light source unit 16 emits light rays of multiple colors including primary colors of red (R), green (G), and blue (B). The light source unit 16 is configured to emit light rays of multiple colors sequentially on a time division basis. Light emitted by the light source unit 16 is totally reflected by the mirror 18 and incident on the micromirror device 15.

The micromirror device 15 includes multiple micromirrors arranged in an array. The micromirrors are rapidly switched on and off to reflect light emitted by the light source unit 16 toward the projector lens 20 and away from the projector lens 20. The micromirror device 15 has an array of micromirrors corresponding to WXGA (Wide eXtended Graphic Array) (1280 horizontal pixels×800 vertical pixels), for example. The micromirror device 15 forms an image with WXGA resolution, for example, by reflection at the micromirrors. The micromirror device 15 thus functions as a spatial light modulation device.

In the present embodiment, an area of the micromirror device 15 in which the micromirrors are arranged and which has a function of forming an image will be referred to as a device area (region).

The projection processor 14 drives the micromirror device 15 to display an image represented by image data sent from the image converter 13. Thus, the projection processor 14 switches the micromirrors of the micromirror device 15 on and off. Note that the projection processor 14 rapidly drives the micromirror device 15 on a time division basis. The number of divisions per unit time is a number obtained by multiplying a frame rate according to a predetermined format, such as 60 [frames/second], the number of divisions for color components, and the number of gradations for display.

The projection processor 14 also controls operation of the light source unit 16 to synchronize with the operation of the micromirror device 15. Specifically, the projection processor 14 controls the operation of the light source unit 16 to divide frames into time slots (segments) and sequentially emit light of every color component for each frame.

The projector lens 20 adjusts light guided by the micromirror device 15 to light for projection onto an object such as a screen (not illustrated), for example. Thus, an optical image formed by light reflected by the micromirror device 15 is projected and displayed onto the object such as the screen via the projector lens 20.

The projector lens 20 has a zoom mechanism and thus has a function of changing the size of an image to be projected.

The projector lens 20 also has a focus adjustment mechanism to adjust the focused state of a projected image.

The light source unit 16, the projector lens 20, and the like thus function as a projection optical system configured to project projection light onto an object.

The audio processor 30 includes an audio source circuit such as a PCM audio source. The audio processor 30 drives the speaker 32 to emit amplified sound on the basis of analog audio data input from the input/output connector part 11 or on the basis of a signal obtained by converting digital audio data provided at the projecting operation into analog data.

The audio processor 30 also generates a beep sound or the like where necessary.

The speaker 32 is a typical speaker that emits audio on the basis of a signal input from the audio processor 30.

The CPU 25 controls operation of the image converter 13, the projection processor 14, and the audio processor 30, as well as the trapezoid correction unit 40, which will be described later and the lens adjustment unit 54.

The CPU 25 is connected to the main memory 26 and the program memory 27. The main memory 26 is an SRAM, for example. The main memory 26 functions as a working memory for the CPU 25. The program memory 27 is an electrically rewritable nonvolatile memory. The program memory 27 stores operation programs to be executed by the CPU 25 and various format data.

The CPU 25 is also connected to the operation unit 28. The operation unit 28 includes a key operation unit provided on the body of the projector 1 and an infrared ray receiving unit configured to receive infrared light from a remote controller (not illustrated) exclusively for the projector 1. The operation unit 28 outputs to the CPU 25 a key operation signal based on a key operation of the user at the key operation unit of the body or the remote controller.

The CPU 25 controls the operation of the respective components of the projector 1 in response to user's instruction from the operation unit 28 by using the programs and data stored in the main memory 26 and the program memory 27.

The attitude sensor 29 has a triaxial acceleration sensor and an orientation sensor that detects orientation, for example. The acceleration sensor detects the attitude angle of the projector 1 to the direction of gravity, that is, the pitch and roll angles thereof. The yaw angle thereof is detected as a relative bearing with respect to a reference orientation detected by the orientation sensor. The attitude sensor 29 outputs the detection result to the trapezoid correction unit 40.

The imaging unit 52 can capture a projection image projected by the projector 1. The imaging unit 52 captures an image according to an instruction from the trapezoid correction unit 40 and outputs the captured imaging data to the trapezoid correction unit 40.

The ranging unit 53 measures the distance from the projector 1 to the object onto which projection is made. The angle of the object with respect to the projector 1, that is, the angle between the optical axis of projection light emitted through the projector lens 20 and the object, for example, can be obtained on the basis of distances to three or more points of the object that are not in the same straight line.

The lens adjustment unit 54 drives the zoom mechanism of the projector lens 20 according to an instruction from the CPU 25 in response to a zoom changing instruction made by user's operation at the operation unit 28. As a result of driving the zoom mechanism by the lens adjustment unit 54, the size of the projected image changes.

The lens adjustment unit 54 also drives a focusing lens of the projector lens 20 according to an instruction from the CPU 25.

The trapezoid correction unit 40 performs processing relating to trapezoid correction (distortion correction) so that an image projected onto the object by projection light emitted through the projector lens 20 can be expressed without distortion.

The trapezoid correction unit 40 includes a comparator 41, a projection area determination unit 42, a device area determination unit 43, and a geometric transformation unit 44.

The comparator 41 compares the aspect ratio (the ratio of width to height) of a rectangular input image input as an image to be projected with the aspect ratio of the micromirror device 15 that is an output display device.

The projection area determination unit 42 determines an effective projection area on the basis of the comparison between the aspect ratio of the input image and the aspect ratio of the micromirror device 15. The effective projection area refers to a projection area in which the shape of projection of light emitted through the projector lens 20 onto the object is rectangular. A method for determining the effective projection area will be described later in detail.

The device area determination unit 43 determines an effective device area so that the relation of the effective projection area with the projection area corresponds to the relation of the effective device area with the device area of the micromirror device 15. Specifically, the device area determination unit 43 determines the effective projection area of the micromirror device 15 so that light entering the effective device area will be projected within the effective projection area of the object and that an image expressed in the effective device area will be rectangular.

The geometric transformation unit 44 performs geometric transformation to project an input image within the effective device area so that the input image will be projected within the effective projection area of the object without distortion. The geometric transformation unit 44 outputs image data resulting from the geometric transformation to the image converter 13.

Projecting operation of the projector 1 according to the present embodiment will be described. The projecting operation is executed by the projection processor 14 under the control of the CPU 25.

Operation of the light source unit 16 is controlled by the projection processor 14. The projection processor 14 sequentially emits light rays of three colors, which are red light (R), green light (G), and blue light (B), from the light source unit 16, for example, by switching on/off of semiconductor lasers or LEDs in the light source unit 16 that emit light rays of the respective colors, and/or changing combination of the light sources and phosphors, or the like. The projection processor 14 make the red light, green light, and blue light sequentially enter the micromirror device 15 from the light source unit 16.

The micromirror device 15 is driven to guide incident light of each color for each micromirror (for each pixel) to the projector lens 20 for a longer time as the gradation based on image data is higher and for a shorter time as the gradation based on image data is lower. In other words, the projection processor 14 controls the micromirror device 15 so that a micromirror corresponding to a pixel with high gradation to be ON for a long time and that a micromirror corresponding to a pixel with low gradation to be OFF for a long time. In this manner, the gradation of each color of light emitted through the projector lens 20 can be expressed by each mirror (pixel).

The gradations expressed by the times during which micromirrors are ON of the respective colors are combined for each frame to express a color image.

As described above, projection light expressing an image is emitted through the projector lens 20. The image is displayed on the screen or the like by projecting the projection light onto the screen.

Although an example of a projector using three colors of red light, green light, and blue light is presented in the above description, a projector may be configured to emit light of complementary colors such as magenta and yellow, or white light, and combine rays of these colors to form an image.

Next, trapezoid correction according to the present embodiment will be described.

Trapezoid correction (distortion correction) corresponds to cut a corrected rectangle out of an uncorrected distorted quadrangle. There are various methods for the cutting. Herein, trapezoid correction is defined as cutting a corrected rectangle so that the relation between an uncorrected distorted quadrangle from which the corrected rectangle is cut out and the corrected rectangle to be cut out in the uncorrected distorted quadrangle meets both of at least one horizontal constraint and at least one vertical constraint and so that the aspect ratio of the corrected rectangle is equal to the aspect ratio of the input image and the area of the corrected rectangle is maximum.

Horizontal constraints and vertical constraints will be described below.

In a coordinate system of a projection plane, the rightward direction is defined as the positive direction of an x axis and the upward direction is defined as the positive direction of a y axis.

First, two examples of the horizontal constraints will be given. Although there are horizontal constraints other than the following two examples, the two horizontal constraints will be focused in the present embodiment.

Figure 2:
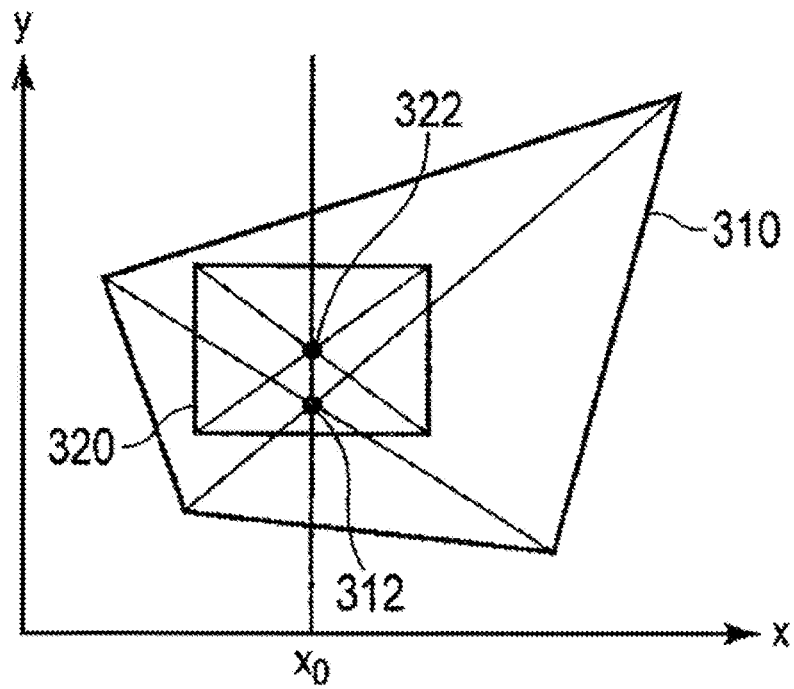
FIG. 2 is a graph for explaining a first horizontal constraint.
Figure 3:
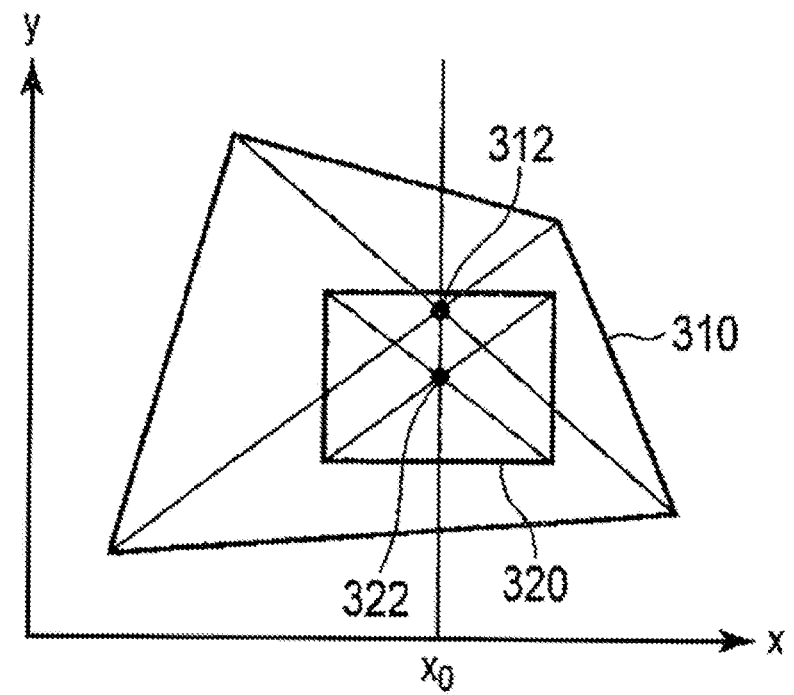
FIG. 3 is a graph for explaining the first horizontal constraint.

A first horizontal constraint is defined as a coincidence of the x coordinate of the intersection of diagonals (invariable x coordinate of the intersection of diagonals). The first horizontal constraint will be described with reference to FIGS. 2 and 3. FIGS. 2 and 3 are schematic graphs showing relative positions between the projection area when the projector 1 projects an image onto the object such as a screen, that is, an uncorrected distorted quadrangle and the effective projection area which is set inside of the projection area and in which an image corresponding to an input image is projected, that is, a corrected rectangle (cut-out area).

As shown in FIGS. 2 and 3, the intersection of two diagonals of the projection area (uncorrected distorted quadrangle) 310 is defined as an uncorrected intersection 312 of diagonals, and the intersection of diagonals of the effective projection area (corrected rectangle) 320 is defined as a corrected intersection 322 of diagonals. In this case, according to the first horizontal constraint, the x coordinate of the uncorrected intersection 312 of diagonals coincides with the x coordinate of the corrected intersection 322 of diagonals.

Figure 4:
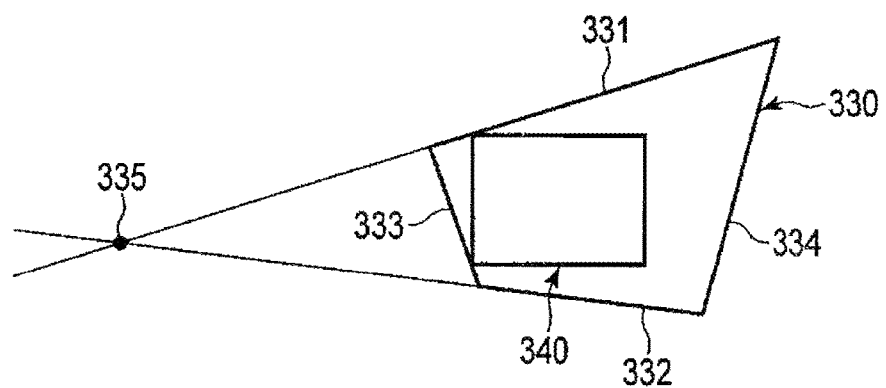
FIG. 4 is a diagram for explaining a second horizontal constraint.
Figure 5:
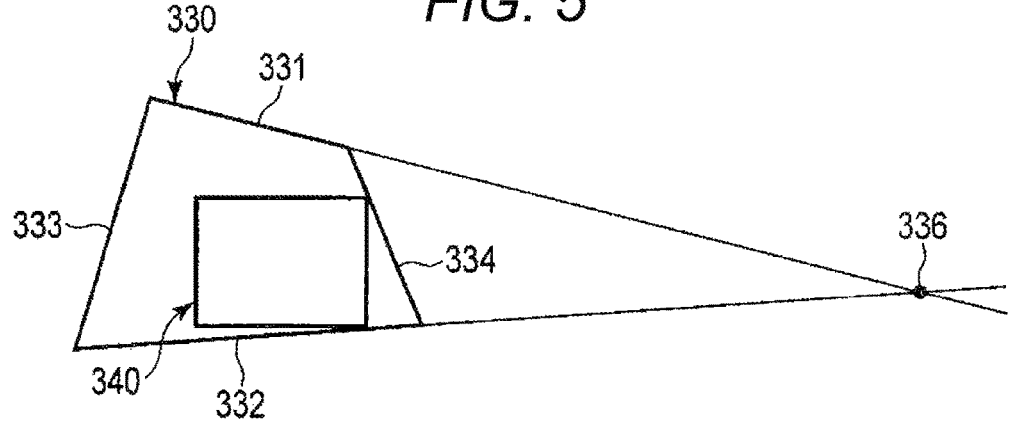
FIG. 5 is a diagram for explaining the second horizontal constraint.

A second horizontal constraint is defined as shifting the effective projection area toward the intersection of upper and lower sides (shifting the effective projection area toward higher pixel density). Note that the intersection of upper and lower sides is defined as an intersection of an extended line of the upper side 331 and an extended line of the lower side 332 of the projection area (uncorrected distorted quadrangle) 330 as shown in FIGS. 4 and 5. The intersection of upper and lower sides may be a leftward intersection 335 of upper and lower sides positioned toward the left side 333 as shown in FIG. 4 or a rightward intersection 336 of upper and lower sides positioned toward the right side 334 as shown in FIG. 5.

In the rightward and leftward direction, the side on which the intersection of upper and lower sides is present is referred to as an upper-and-lower-side intersection side and the opposite side is referred to as an opposite upper-and-lower-side intersection side. In this case, in terms of the density of pixels on the projection plane, the upper-and-lower-side intersection side can be said to be a higher pixel density side while the opposite upper-and-lower-side intersection side can be said to be a lower pixel density side.

The second horizontal constraint is thus to inscribe the effective projection area (corrected rectangle) 340 in contact with the left side of the projection area (uncorrected distorted quadrangle) 330 when the intersection of upper and lower sides is on the left as shown in FIG. 4, or to inscribe the effective projection area (corrected rectangle) 340 in contact with the right side of the projection area (uncorrected distorted quadrangle) 330 when the intersection of upper and lower sides is on the right as shown in FIG. 5.

Next, two examples of vertical constraints will be given. Although there are vertical constraints other than the following two examples, the two vertical constraints will be focused in the present embodiment.

Figure 6:
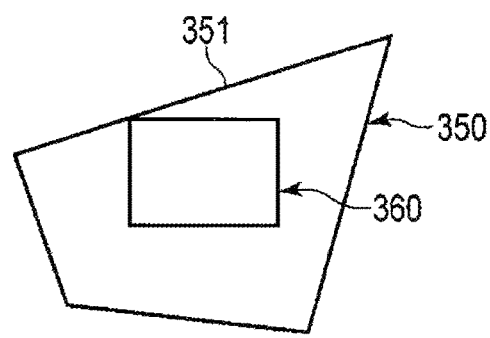
FIG. 6 is a diagram for explaining a first vertical constraint.
Figure 7:
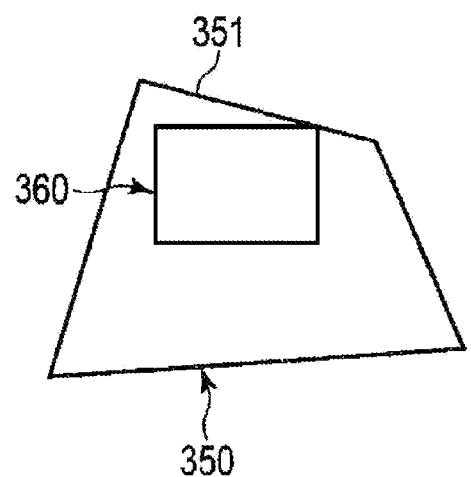
FIG. 7 is a diagram for explaining the first vertical constraint.

A first vertical constraint is defined as shifting the effective projection area upward. Specifically, the first vertical constraint is to inscribe the effective projection area (corrected rectangle) 360 in contact with the upper side 351 of the projection area (uncorrected distorted quadrangle) 350 (upper-side inscription) as illustrated in FIGS. 6 and 7.

Although not illustrated, the first vertical constraint is deemed to be met when the projection area (uncorrected distorted quadrangle) 350 and the effective projection area (corrected rectangle) 360 have a common upper-left vertex coordinate, a common upper-right vertex coordinate, or both a common upper-left vertex coordinate and a common upper-right vertex coordinate.

Figure 8:
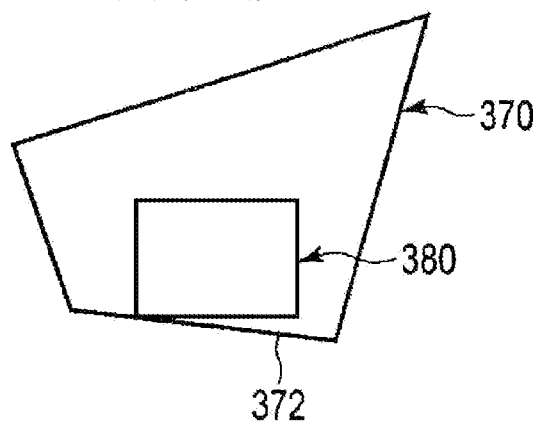
FIG. 8 is a diagram for explaining a second vertical constraint.
Figure 9:
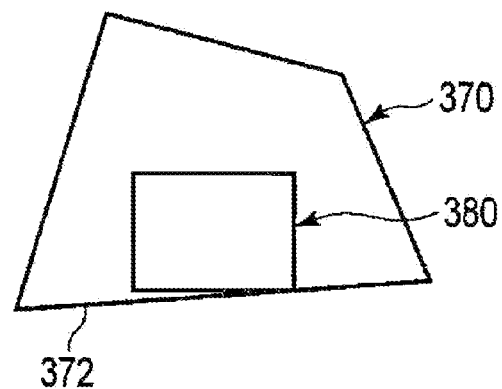
FIG. 9 is a diagram for explaining the second vertical constraint.

A second vertical constraint is defined as shifting the effective projection area downward. Specifically, the second vertical constraint is to inscribe the effective projection area (corrected rectangle) 380 in contact with the lower side 372 of the projection area (uncorrected distorted quadrangle) 370 (lower-side inscription) as illustrated in FIGS. 8 and 9.

Although not illustrated, the second vertical constraint is deemed to be met when the projection area (uncorrected distorted quadrangle) 370 and the effective projection area (corrected rectangle) 380 have a common lower-left vertex coordinate, a common lower-right vertex coordinate, or both a common lower-left vertex coordinate and a common lower-right vertex coordinate.

Next, the relation of the numbers of horizontal and vertical pixels (aspect ratio) of an input image and those of an output display device with trapezoid correction will be described.

There are various combinations of the numbers of horizontal and vertical pixels of an input image and those of the output display device. Examples of the combinations include 1680 horizontal pixels and 1050 vertical pixels (aspect ratio: 1.600), 1600 horizontal pixels and 900 vertical pixels (aspect ratio: 1.778), 1280 horizontal pixels and 800 vertical pixels (aspect ratio: 1.600), and 800 horizontal pixels and 600 vertical pixels (aspect ratio: 1.333).

As an example, trapezoid correction of the projector 1 when the aspect ratio of the input image is 4:3 (aspect ratio: approximately 1.33) and the aspect ratio of the micromirror device 15 that is an output display device is 16:9 (aspect ratio: approximately 1.78) will be described.

First, trapezoid correction when the horizontal constraint is the first horizontal constraint (invariable x coordinate of the intersection of diagonals) and the vertical constraint is the second vertical constraint (shifting downward) will be described with reference to FIGS. 10 and 11.

Figure 10:
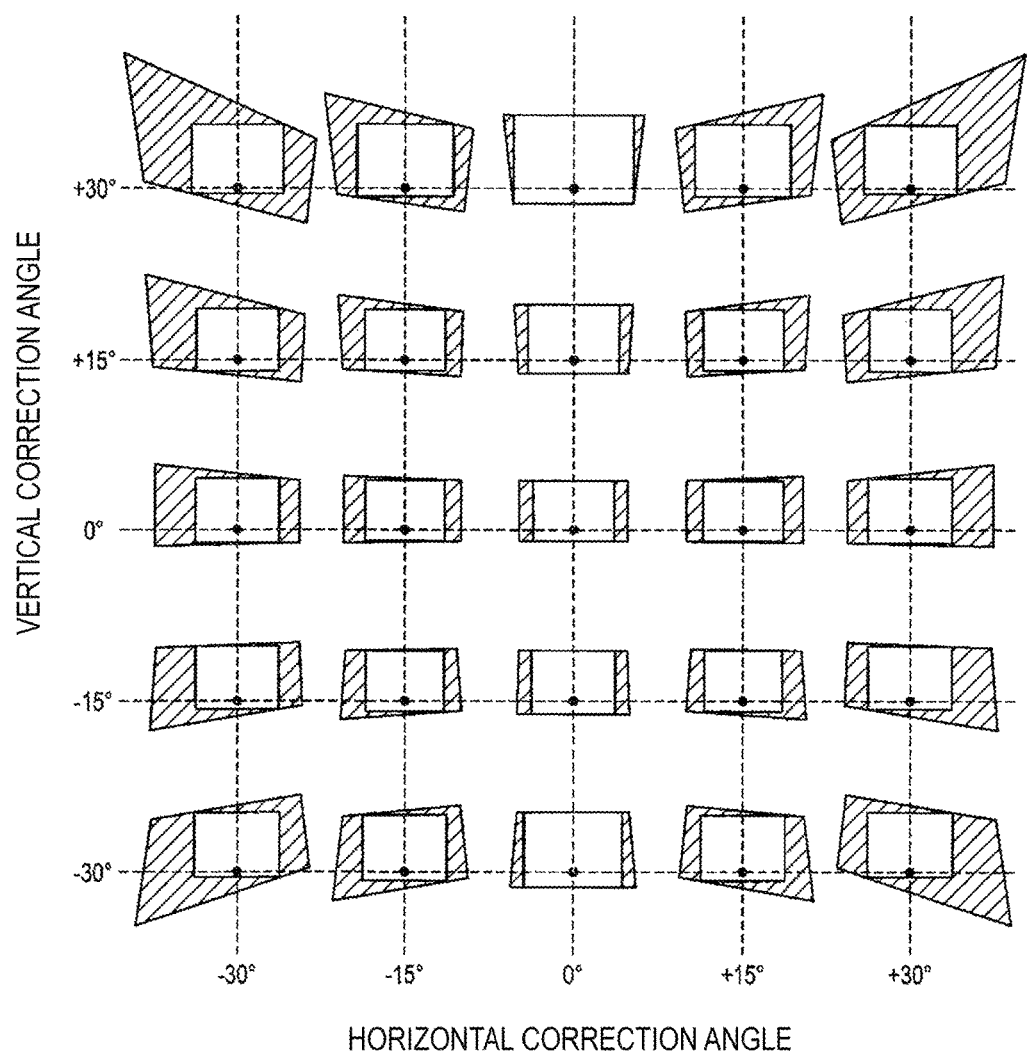
FIG. 10 is a diagram illustrating shapes of quadrangles before and after trapezoid correction on a projection plane and information related thereto when an input image has an aspect ratio of 4:3 and a micromirror device has an aspect ratio of 16:9 and when the first horizontal constraint and the second vertical constraint are used.

FIG. 10 illustrates shapes of quadrangles before and after trapezoid correction on the projection plane of the object such as a screen and information related thereto. In FIG. 10, a white rectangle represents the effective projection area (corrected rectangle), and a quadrangle containing the white rectangle and a hatched area represents the projection area (uncorrected distorted quadrangle). Thus, in FIG. 10, a hatched area represents a picture ineffective area in which no picture will be expressed as a result of the trapezoid correction. In addition, a black dot in FIG. 10 represents the position of the optical axis.

Note that an optical system of a front projector is typically designed to be horizontally symmetric and vertically asymmetric (vertical shift system). In many cases, a projector is typically designed so that the optical axis is near the center of the lower side of the projection area (so that the optical system is an upward shift system). Here, the projector 1 according to the present embodiment is also designed so that the optical axis is near the center of the lower side of the projection area as illustrated in FIG. 10.

Figure 11:
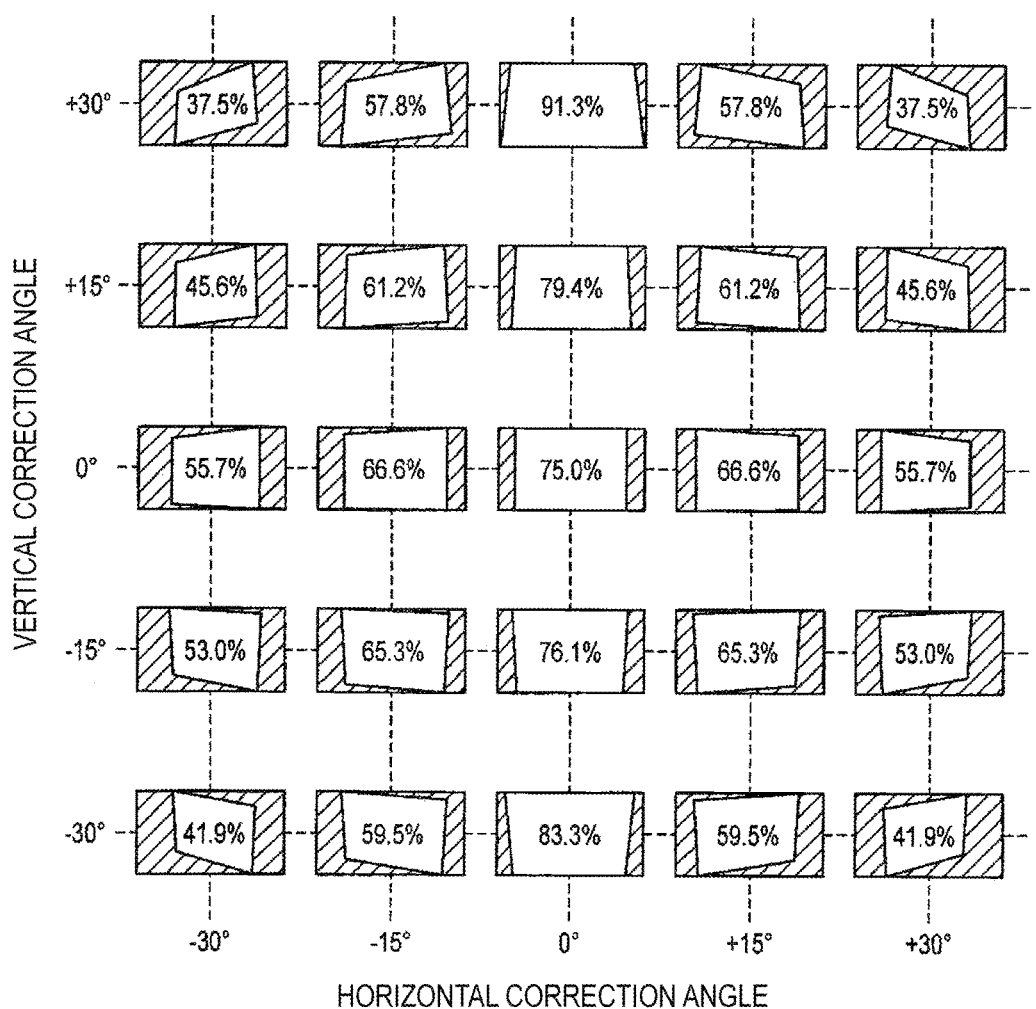
FIG. 11 is a diagram illustrating shapes of quadrangles after trapezoid correction on the micromirror device and information related thereto when an input image has an aspect ratio of 4:3 and the micromirror device has an aspect ratio of 16:9 and when the first horizontal constraint and the second vertical constraint are used.

FIG. 11 illustrates shapes of quadrangles after trapezoid correction on the micromirror device 15 that is an output display device of the projector 1 and information related thereto. In FIG. 11, a white quadrangle represents the effective device area that is an area of the micromirror device 15 used for projection, and a rectangle containing the white quadrangle and a hatched area represents the device area that is the entire micromirror device 15. Thus, a hatched area in FIG. 11 represents an ineffective device area corresponding to the picture ineffective area illustrated in FIG. 10.

A percentage stated in FIG. 11 represents a pixel usage. The pixel usage is a proportion of the area of the effective device area (region) (an area obtained by excluding the ineffective device area from the device area) to the entire pixel area (a proportion of the effective device area in the device area).

The values in FIGS. 10 and 11 are calculated in a case in which the throw ratio is approximately 0.46 and the optical axis position of the output device is higher than the center of the base by approximately 20% of the height of the output device (60% upward shift system).

The trapezoid correction is determined according to a correction angle in the horizontal direction (hereinafter referred to as a horizontal correction angle) and a correction angle in the vertical direction (hereinafter referred to as a vertical correction angle). The correction angles correspond to the differences in the horizontal angle and the vertical angle between the optical axis direction and the normal direction of the object plane.

In FIGS. 10 and 11, the horizontal correction angle and the vertical correction angle are each indicated at 15-degree intervals between −30 and +30 degrees. Thus, the figures at the center of FIGS. 10 and 11 each represent a case in which the horizontal correction angle is 0° and the vertical correction angle is 0°, that is, a case in which the optical axis direction not being subjected to the trapezoid correction and the normal direction of the object plane coincide with each other. In contrast, the figures other than the center figures represent cases in which trapezoid correction is conducted.

Next, trapezoid correction when the horizontal constraint is the second horizontal constraint (shifting toward the intersection of upper and lower sides) and the vertical constraint is the second vertical constraint (shifting downward) will be described with reference to FIGS. 12 and 13.

Figure 12:
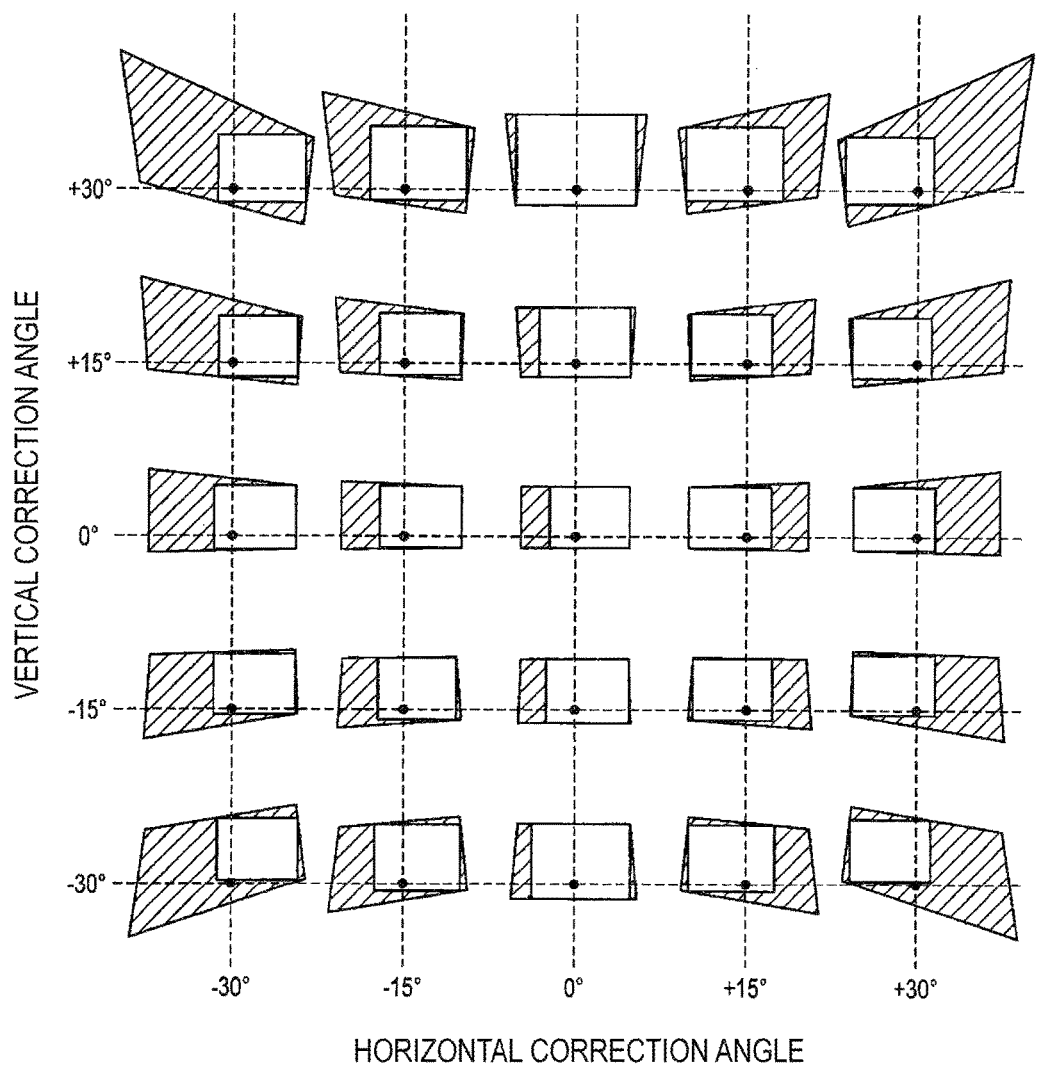
FIG. 12 is a diagram illustrating shapes of quadrangles before and after trapezoid correction on the projection plane and information related thereto when an input image has an aspect ratio of 4:3 and the micromirror device has an aspect ratio of 16:9 and when the second horizontal constraint and the second vertical constraint are used.

FIG. 12 illustrates shapes of quadrangles before and after trapezoid correction on the projection plane of the object such as a screen, that is, the relations between the projection area and the effective projection area, and information related thereto. FIG. 13 illustrates shapes of quadrangles after trapezoid correction on the micromirror device 15 that is an output display device of the projector 1, that is, the relations between the device area and the effective device area, and information related thereto.

Figure 13:
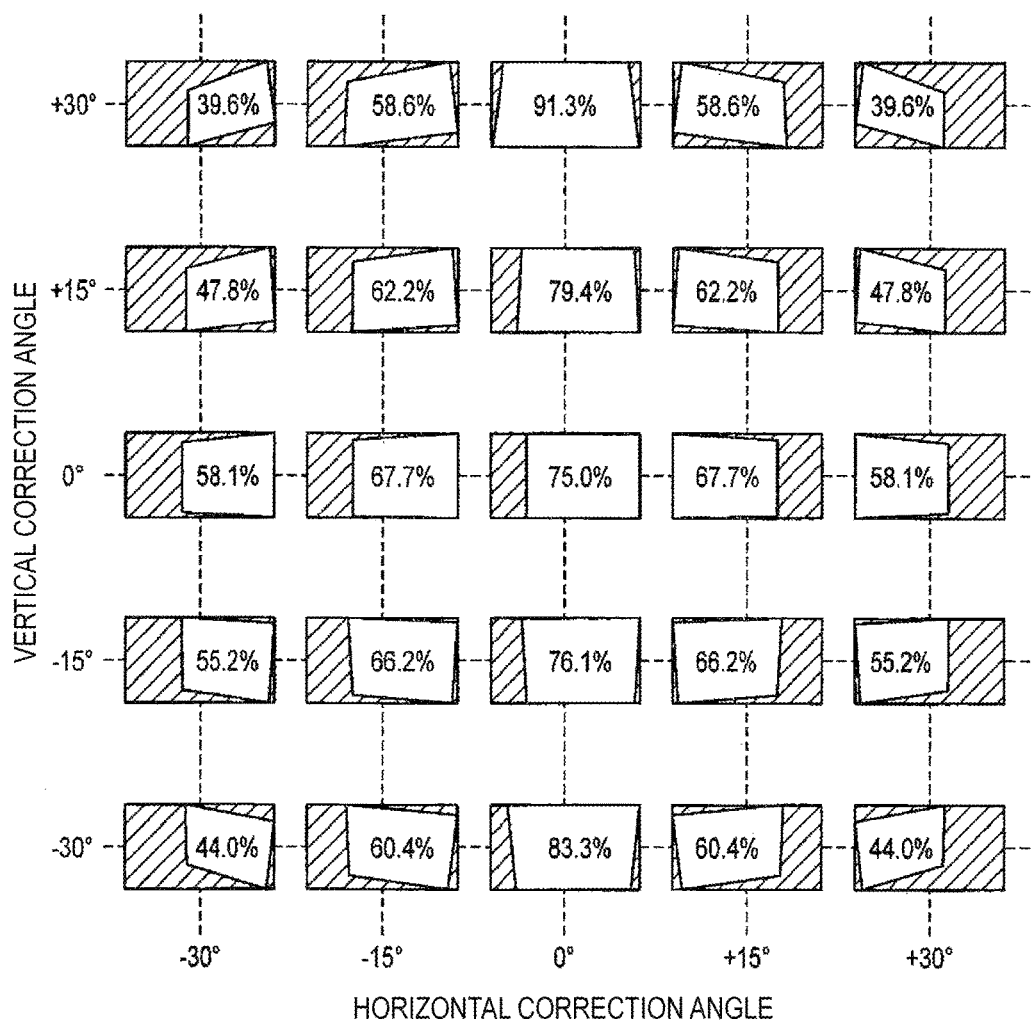
FIG. 13 is a diagram illustrating shapes of quadrangles after trapezoid correction on the micromirror device and information related thereto when an input image has an aspect ratio of 4:3 and the micromirror device has an aspect ratio of 16:9 and when the second horizontal constraint and the second vertical constraint are used.

The expressions in FIG. 12 are similar to those in FIG. 10 and the expressions in FIG. 13 are similar to those in FIG. 11.

The values in FIGS. 12 and 13 are also calculated in a case in which the throw ratio is approximately 0.46 and the optical axis position of the output device is higher than the center of the base by approximately 20% of the height of the output device (60% upward shift system).

As illustrated in FIGS. 11 and 13, the pixel usage when the trapezoid correction is not conducted (horizontal correction angle: 0°, vertical correction angle: 0°) is 75% both in the cases where the first horizontal constraint is used and where the second horizontal constraint is used. In contrast, the pixel usage is 75% or higher in both cases when the horizontal correction angle is 0° and the vertical correction angle is not 0°.

Thus, in a case where the input image has an aspect ratio of 4:3 and the output display device has an aspect ratio of 16:9, an effect that the pixel usage is increased can be produced when the horizontal correction angle is 0° and the vertical correction angle is not 0°.

When the second horizontal constraint is used, however, the following problem will be posed.

FIGS. 12 and 13 illustrate cases in which a corrected rectangle is shifted toward the right side when the horizontal correction angle is 0°. When the horizontal correction angle is 0°, however, the side toward which a corrected rectangle is shifted may be either the right side or the left side. Thus, at a horizontal correction angle near 0°, the corrected rectangle is shifted toward the right side or toward the left side depending on a slight difference in the correction angle. The horizontal position of the effective projection area (corrected rectangle) is unstable at a horizontal correction angle near 0° in this manner.

Furthermore, when the first horizontal constraint is used as illustrated in FIG. 10, a smaller misalignment between the position of the projection image and the optical axis position than the case of FIG. 12 is achieved. The smaller misalignment between the position of the projection image and the optical axis position produces such an effect as making it easier for the user to adjust the projection position in setting.

In contrast, when the second horizontal constraint is used as illustrated in FIG. 12, the misalignment between the position of the projection image and the optical axis position is relatively larger.

As described above, when the input image has a smaller aspect ratio than the output display device such as, for example, when the input image has an aspect ratio of 4:3 (aspect ratio: approximately 1.33) and the output display device has an aspect ratio of 16:9 (aspect ratio: approximately 1.78), it can be seen that it is preferable to use the first horizontal constraint as the horizontal constraint.

Next, trapezoid correction of the projector 1 when the aspect ratio of the input image is 16:9 (aspect ratio: approximately 1.78) and the aspect ratio of the micromirror device 15 that is an output display device is 4:3 (aspect ratio: approximately 1.33) will be described.

First, trapezoid correction when the horizontal constraint is the first horizontal constraint (invariable x coordinate of the intersection of diagonals) and the vertical constraint is the second vertical constraint (shifting downward) will be described with reference to FIGS. 14 and 15.

Figure 14:
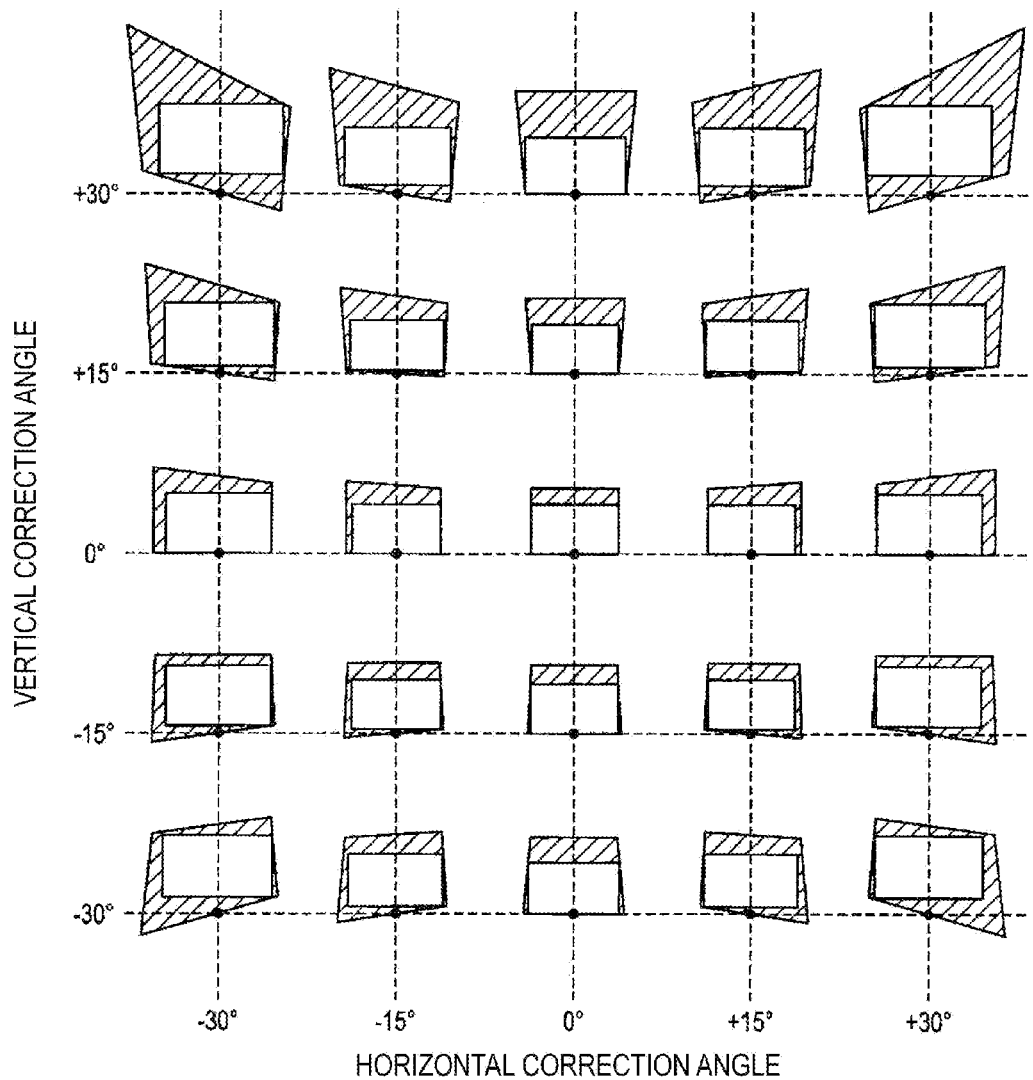
FIG. 14 is a diagram illustrating shapes of quadrangles before and after trapezoid correction on the projection plane and information related thereto when an input image has an aspect ratio of 16:9 and the micromirror device has an aspect ratio of 4:3 and when the first horizontal constraint and the second vertical constraint are used.

FIG. 14 illustrates shapes of quadrangles before and after trapezoid correction on the projection plane of the object such as a screen, that is, the relations between the projection area and the effective projection area, and information related thereto. FIG. 15 illustrates shapes of quadrangles after trapezoid correction on the micromirror device 15 that is an output display device of the projector 1, that is, the relations between the device area and the effective device area, and information related thereto.

Figure 15:
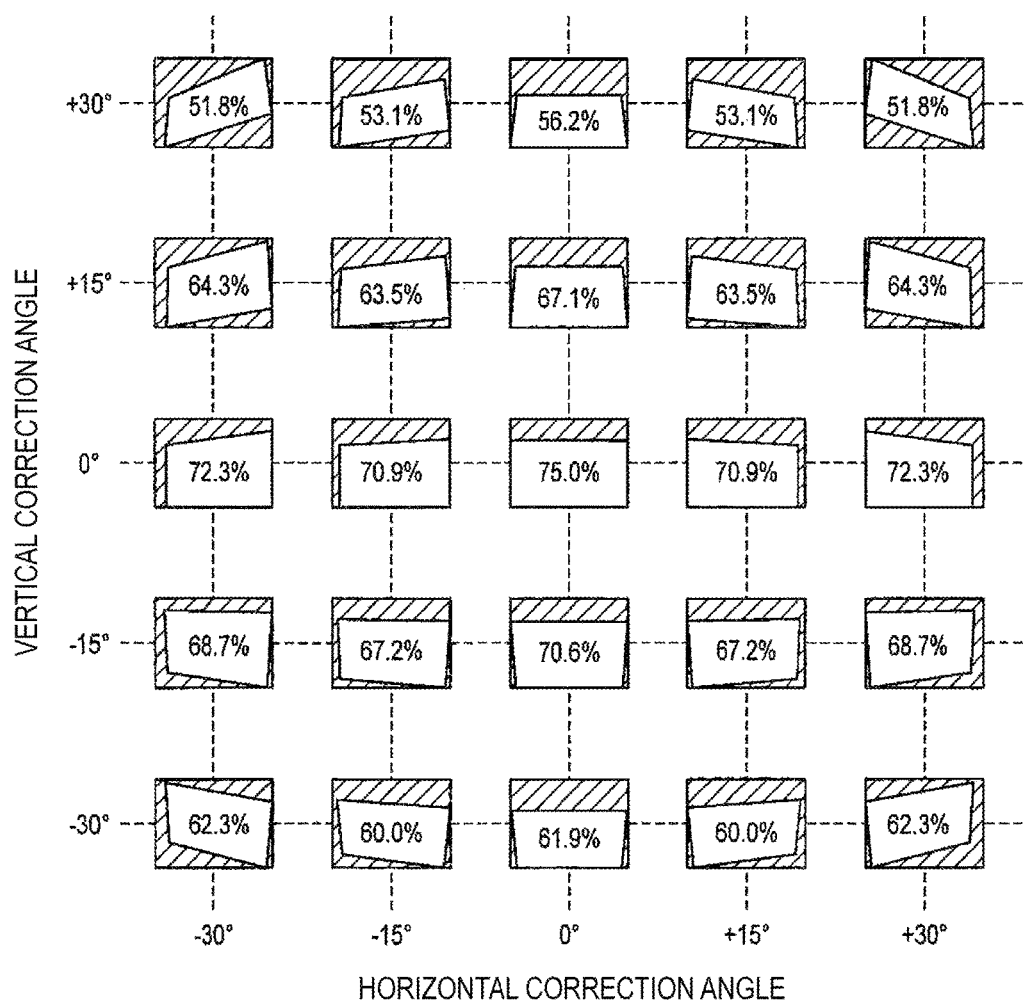
FIG. 15 is a diagram illustrating shapes of quadrangles after trapezoid correction on the micromirror device and information related thereto when an input image has an aspect ratio of 16:9 and the micromirror device has an aspect ratio of 4:3 and when the first horizontal constraint and the second vertical constraint are used.

The expressions in FIG. 14 are similar to those in FIG. 10 and the expressions in FIG. 15 are similar to those in FIG. 11.

The values in FIGS. 14 and 15 are calculated in a case in which the throw ratio is approximately 0.36 and the optical axis position of the output device is at the center of the base (100% upward shift system).

Next, trapezoid correction when the horizontal constraint is the second horizontal constraint (shifting toward the intersection of upper and lower sides) and the vertical constraint is the second vertical constraint (shifting downward) will be described with reference to FIGS. 16 and 17.

Figure 16:
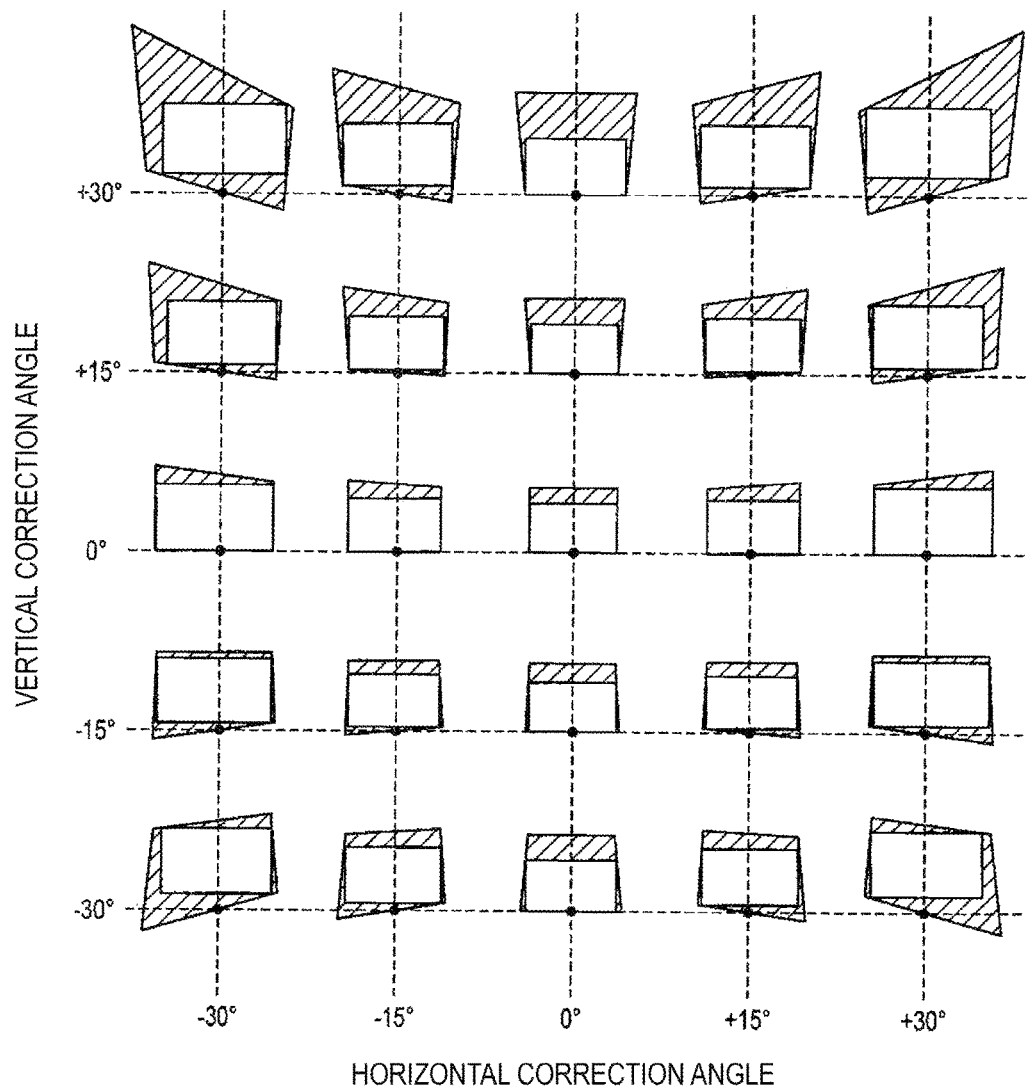
FIG. 16 is a diagram illustrating shapes of quadrangles before and after trapezoid correction on the projection plane and information related thereto when an input image has an aspect ratio of 16:9 and the micromirror device has an aspect ratio of 4:3 and when the second horizontal constraint and the second vertical constraint are used.

FIG. 16 illustrates shapes of quadrangles before and after trapezoid correction on the projection plane of the object such as a screen, that is, the relations between the projection area and the effective projection area, and information related thereto. FIG. 17 illustrates shapes of quadrangles after trapezoid correction on the micromirror device 15 that is an output display device of the projector 1, that is, the relations between the device area and the effective device area, and information related thereto.

Figure 17:
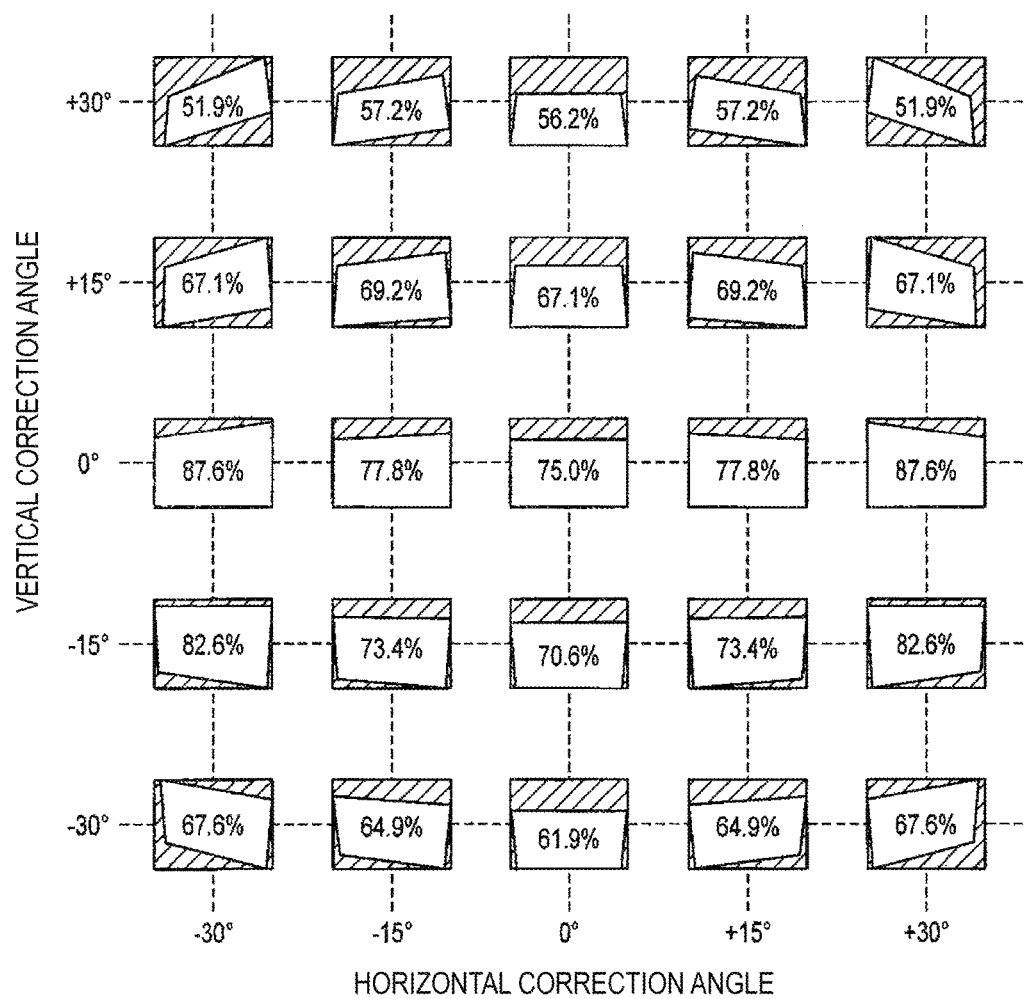
FIG. 17 is a diagram illustrating shapes of quadrangles after trapezoid correction on the micromirror device and information related thereto when an input image has an aspect ratio of 16:9 and the micromirror device has an aspect ratio of 4:3 and when the second horizontal constraint and the second vertical constraint are used.

The expressions in FIG. 16 are similar to those in FIG. 10 and the expressions in FIG. 17 are similar to those in FIG. 11.

The values in FIGS. 16 and 17 are also calculated in a case in which the throw ratio is approximately 0.36 and the optical axis position of the output device is at the center of the base (100% upward shift system).

As illustrated in FIG. 17, the pixel usage when the trapezoid correction is not conducted (horizontal correction angle: 0°, vertical correction angle: 0°) is 75% in the case where the second horizontal constraint is used. In contrast, the pixel usage is 75% or higher when the vertical correction angle is 0° and the horizontal correction angle is not 0°.

Thus, according to the second horizontal constraint, in a case where the input image has an aspect ratio of 16:9 and the output display device has an aspect ratio of 4:3, an effect that the pixel usage is increased can be produced when the vertical correction angle is 0° and the horizontal correction angle is not 0°.

In contrast, as illustrated in FIG. 15, in a case where the first horizontal constraint is used, however, the pixel usage is 75% when the trapezoid correction is not conducted.

In contrast, when the vertical correction angle is 0° and the horizontal correction angle is not 0°, the pixel usage is lower than 75% in any cases.

Furthermore, when the second horizontal constraint is used as illustrated in FIG. 16, a misalignment is caused between the position of the effective projection area and the optical axis position. The misalignment is, however, much smaller than the case of FIG. 12, which produces such an effect as making it easier for the user to adjust the projection position in setting similarly to the case of FIG. 10.

As described above, when the input image has a larger aspect ratio than the output display device such as, for example, when the input image has an aspect ratio of 16:9 (aspect ratio: approximately 1.78) and the output display device has an aspect ratio of 4:3 (aspect ratio: approximately 1.33), it can be seen that it is preferable to use the second horizontal constraint as the horizontal constraint.

As described above, according to the present embodiment, the first horizontal constraint is used as the horizontal constraint when the input image has a smaller aspect ratio than the output display device, and the second horizontal constraint is used as the horizontal constraint when the input image has a larger aspect ratio than the output display device. When the aspect ratio of the input image and that of the output display device are equal, the horizontal constraint may be either the first horizontal constraint or the second horizontal constraint, but the first horizontal constraint is used in the present embodiment.

Furthermore, the projector 1 according to the present embodiment is designed so that the optical axis thereof is near the center of the base of the projection area (upward shift system) as illustrated in FIG. 10 and others. It is thus preferable to use the second vertical constraint as the vertical constraint to minimize the misalignment between the optical axis position and the effective projection area.

If the projector 1 is designed to have an optical axis near the center of the upper side of the projection area (downward shift system), it is preferable to use the first vertical constraint to minimize the misalignment between the optical axis position and the effective projection area.

Figure 18:
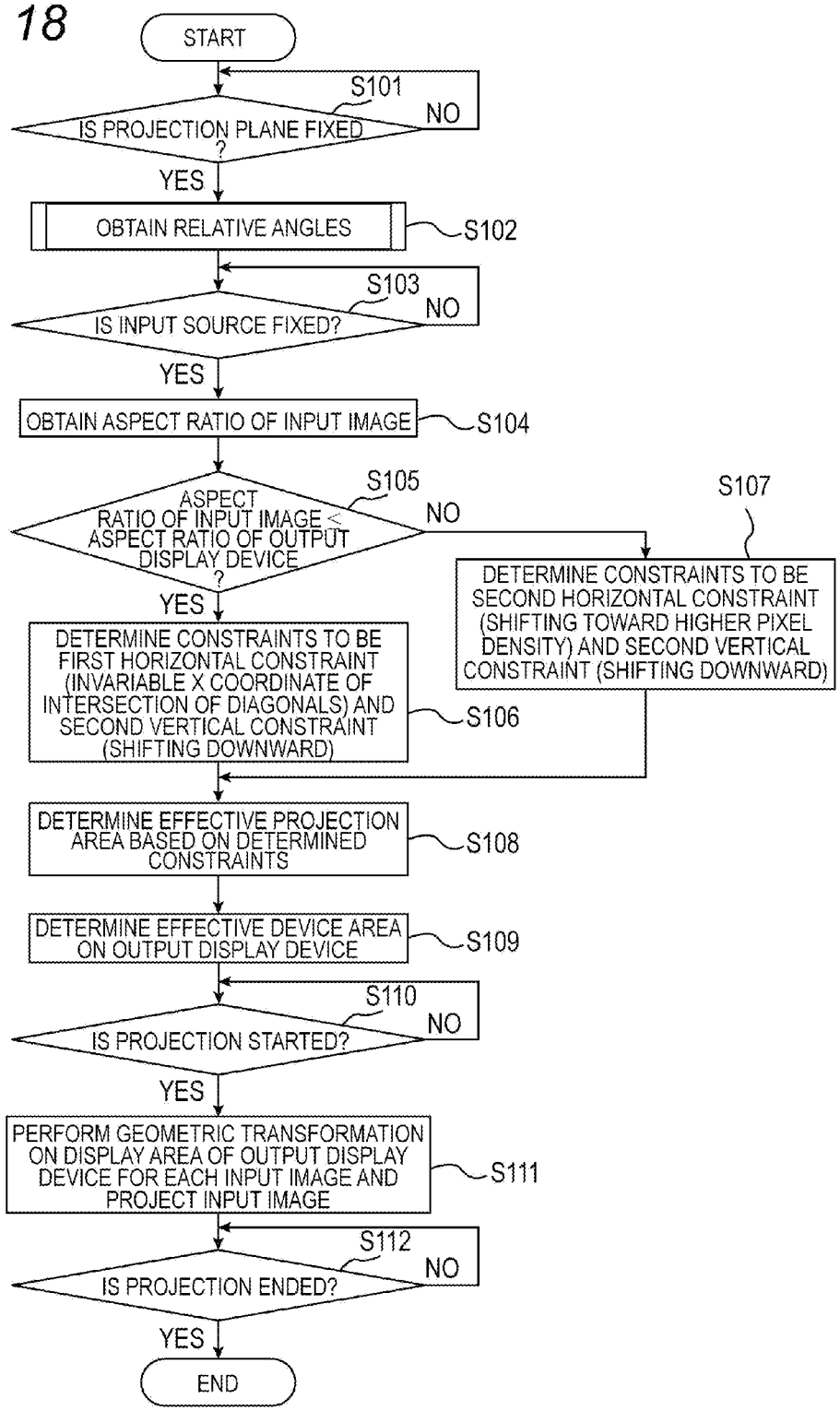
FIG. 18 is a flowchart illustrating an example of a trapezoid correction process according to an embodiment of the present invention.

An example of operation of the trapezoid correction unit 40 according to the present embodiment for the trapezoid correction as described above will be described with reference to the flowchart illustrated in FIG. 18.

In step S101, the trapezoid correction unit 40 determines whether or not the projection plane is fixed (determined). Specifically, the trapezoid correction unit 40 analyzes an image of the object captured by the imaging unit 52, and determines whether or not the positional relation between the projector 1 and the object are fixed. If the object is assumed to be fixed, the trapezoid correction unit 40 may detect motion of the projector 1 on the basis of an output from the acceleration sensor and determine that the positional relation is fixed when the motion of the projector 1 is not detected any longer.

If it is determined that the projection plane is not fixed, the process returns to step S101. Thus, the process repeats step S101 and waits until the projection plane is determined to be fixed. When the projection plane is determined to be fixed, the process proceeds to step S102.

In step S102, the trapezoid correction unit 40 obtains relative angles between the projection plane and the optical axis of the projector lens 20. The relative angles include a vertical inclination angle v that is an angle in the vertical direction and a horizontal inclination angle h that is an angle in the horizontal direction.

A known technique is used for obtaining the relative angles. For example, a multipoint ranging technique can be used. Specifically, the relative angles can be obtained by measuring the distances between three or more points on the projection plane that are not in the same straight line and the projector 1 by the ranging unit 53. Ranging allows the relative angles to be obtained with high accuracy and appropriately.

Alternatively, the relative angles can be obtained by projecting a test chart on the projection plane and detecting the chart by a phase sensor, or by providing two imaging units 52 and using the parallax therebetween.

If the projection plane such as a screen is assumed to be vertical, the vertical inclination angle v of the relative angles can be obtained on the basis of the attitude of the projector 1 obtained by the attitude sensor 29. The relative angles can be easily obtained on the basis of the attitude.

If the screen is assumed to be rectangular, the vertical inclination angle v and the horizontal inclination angle h can be calculated from the shape of the screen captured by the imaging unit 52.

In step S103, the trapezoid correction unit 40 determines whether or not an input source such as an image signal from an external device is fixed (determined). Specifically, the trapezoid correction unit 40 determines whether or not a signal input from a device connected to the input/output connector part 11 is stabilized in format. If the input source is determined not to be fixed, the process returns to step S103. Thus, the process repeats step S103 and waits until the input source is determined to be fixed. When the input source is determined to be fixed, the process proceeds to step S104.

In the present embodiment, the projector 1 is configured to determine whether the projection plane is fixed in step S101 and whether the input source is fixed in step S103. This is, however, merely an example, and the projector 1 may be configured so that the process proceeds assuming that the projection plane and the input source are fixed when the user has pushed (specified) a button or the like for starting trapezoid correction.

In step S104, the trapezoid correction unit 40 obtains the aspect ratio of the input image input by the input/output connector part 11. The aspect ratio may be 4:3 or 16:9, for example.

In step S105, the trapezoid correction unit 40 compares the aspect ratio of the input image with the aspect ratio of the micromirror device 15 that is an output display device and determines whether or not the aspect ratio of the input image is equal to or smaller than the aspect ratio of the output display device.

If the aspect ratio of the input image is determined to be equal to or smaller than that of the output display device, the process proceeds to step S106. In step S106, the trapezoid correction unit 40 sets the horizontal constraint to the first horizontal constraint (invariable x coordinate of the intersection of diagonals). The trapezoid correction unit 40 also sets the vertical constraint to the second vertical constraint (shifting downward) on the basis of the design relating to the optical axis of the projector 1. The process then proceeds to step S108.

If the aspect ratio of the input image is determined not to be equal to or smaller than that of the output display device in step S105, the process proceeds to step S107. In step S107, the trapezoid correction unit 40 sets the horizontal constraint to the second horizontal constraint (shifting toward higher pixel density (shifting toward the intersection of upper and lower sides)). The trapezoid correction unit 40 also sets the vertical constraint to the second vertical constraint (shifting downward) on the basis of the design relating to the optical axis of the projector 1. The process then proceeds to step S108.

In step S108, the trapezoid correction unit 40 determines the corrected rectangular effective projection area for the uncorrected distorted projection area on the projection plane on the basis of the determined horizontal and vertical constraints.

For the determination of the effective projection area, the vertical inclination angle v and the horizontal inclination angle h obtained in step S102, for example, are used. For example, the trapezoid correction unit 40 may store the relation of the vertical inclination angle v and the horizontal inclination angle h with the projection area and the effective projection area, and the effective projection area may be determined on the basis of the relations. Alternatively, the effective projection area may be determined on the basis of an image obtained by capturing the projection plane by the imaging unit 52.

In step S109, the trapezoid correction unit 40 determines the effective device area in the device area of the micromirror device 15 that is an output display device through projective transformation so that the effective projection area with respect to the projection area corresponds to the effective device area with respect to the device area of the micromirror device 15.

In step S110, the trapezoid correction unit 40 determines whether or not projection of the input image onto the projection plane is started. If projection is determined not to be started, the process returns to step S110. Thus, the process repeats step S110 and waits until projection is started. When projection is determined to be started, the process proceeds to step S111.

In step S111, the trapezoid correction unit 40 generates image data to be input to the image converter 13 through projective transformation of the input image to the effective device area of the micromirror device 15.

In step S112, the trapezoid correction unit 40 determines whether or not projection is ended. If projection is determined not to be ended, the process returns to step S111 and the trapezoid correction unit 40 continues generation of image data. Thus, the trapezoid correction unit 40 continues to generate image data to be input to the image converter 13 on the basis of the input image.

The image converter 13 to which the image data are input converts the image data to adjust the resolution, the gradation, and the like thereof, and outputs, to the projection processor 14, the image data as image data in a predetermined format suitable for projection.

The projection processor 14 causes the micromirror device 15 and the light source unit 16 to operate on the basis of the input image data, and emits projection light on the basis of the image data through the projector lens 20. By the projection light, the input image is projected without distortion on the projection plane of a screen of the like.

In the present embodiment, an example in which the image data subjected to trapezoid correction by the geometric transformation unit 44 of the trapezoid correction unit 40 are input to the image converter 13 is presented. Alternatively, the projector 1 may be configured so that the trapezoid correction is performed by the image converter 13 instead of the geometric transformation unit 44.

If projection is determined to be ended in step S112, the process is terminated.

The projector 1 according to the present embodiment is designed so that the optical axis is near the center of the base of the projection area (upward shift system) as illustrated in FIG. 10. Thus, the second vertical constraint is used as the vertical constraint in the present embodiment. Alternatively, when the projector 1 is designed so that the optical axis is near the center of the upper side of the projection area (downward shift system), the second vertical constraint can be used.

According to the present embodiment, since the constraint conditions for the trapezoid correction are determined on the basis of the relation between the aspect ratio of the input image and that of the output display device, the trapezoid correction can be properly conducted. The following advantageous effects can be produced by determining the constraint conditions as in the present embodiment.

With the manner in which the horizontal direction of the effective projection area is set according to the present embodiment, the pixel usage of the micromirror device can be increased. As a result, the projector 1 according to the present embodiment can conduct projection with high brightness and high resolution.

Furthermore, the misalignment between the center in the horizontal direction of the effective projection area and the position in the horizontal direction of the optical axis in the projection area is either eliminated or becomes very small. As a result, it is easier to adjust the installation angles of the projector 1 with respect to the object in trapezoid correction.

Furthermore, regarding the manner in which the vertical direction of the effective projection area is set, misalignment between the optical axis and the effective projection area can be made smaller by setting the vertical direction of the effective projection area on the basis of the position of the optical axis with respect to the projection area as in the present embodiment.

[Comparative Examples]

For trapezoid correction when the aspect ratios of the input image and the output display device are different, a technique as follows is known. Specifically, according to the technique, the aspect ratio of the input image is first adjusted to the aspect ratio of the output display device through letterboxing or pillarboxing. According to the technique, typical trapezoid correction is then performed.

The relation between the projection area and the effective projection area and the relation between the device area and the effective device area in a case in which trapezoid correction is performed in such procedures will be described with reference to the drawings.

Figure 19:
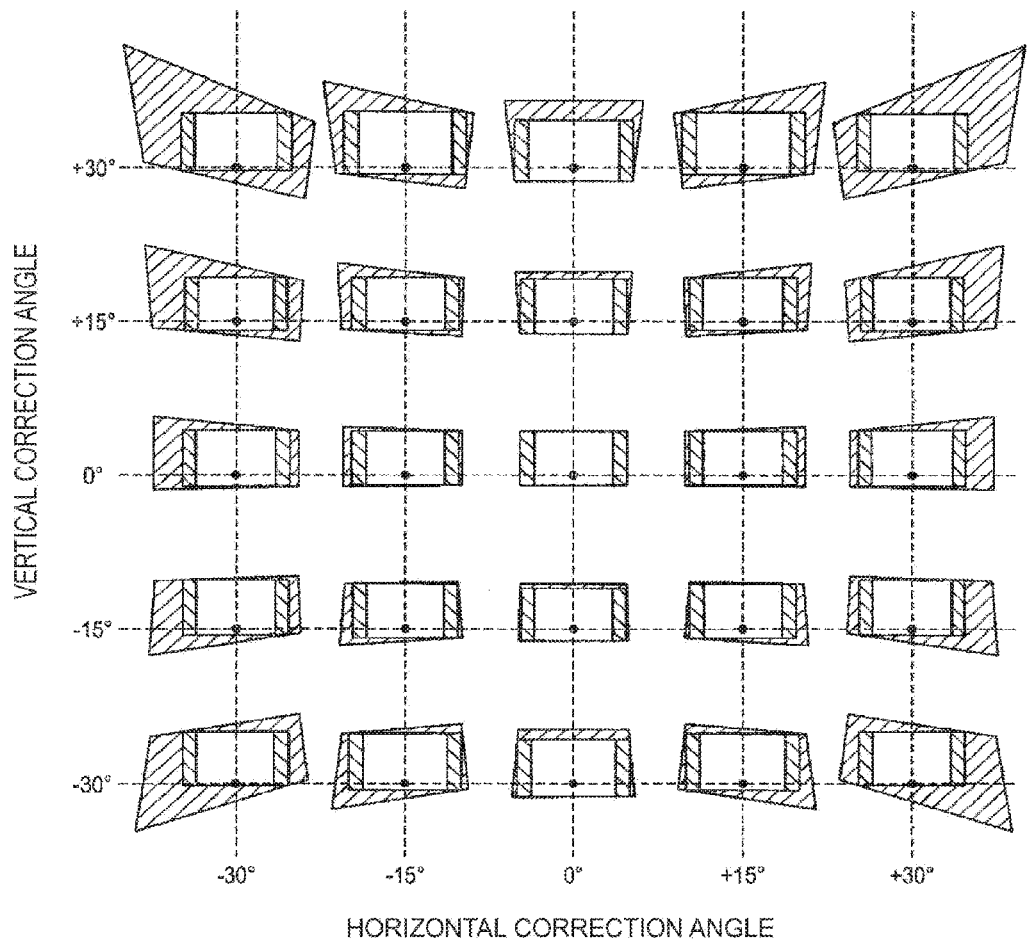
FIG. 19 is a diagram illustrating shapes of quadrangles before and after trapezoid correction on a projection plane and information related thereto according to the related art when an input image has an aspect ratio of 4:3 and a micromirror device has an aspect ratio of 16:9.
Figure 20:
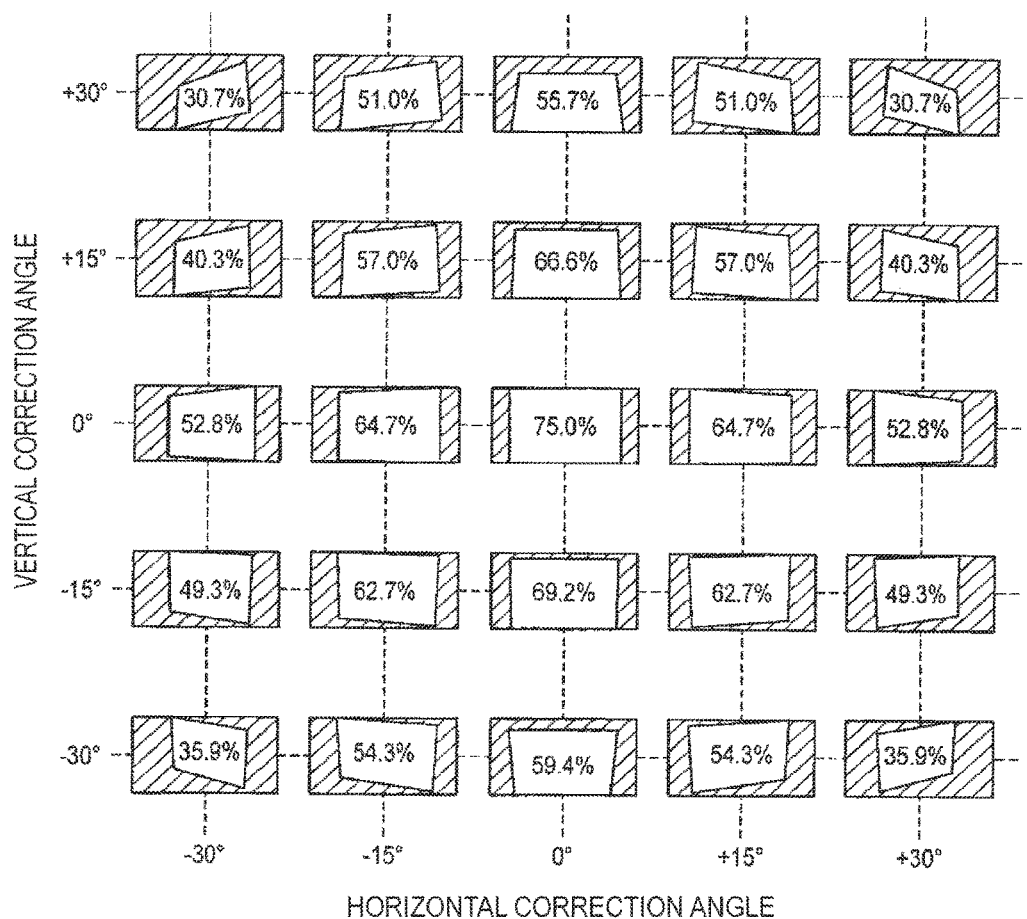
FIG. 20 is a diagram illustrating shapes of quadrangles after trapezoid correction on the micromirror device and information related thereto according to the related art when an input image has an aspect ratio of 4:3 and the micromirror device has an aspect ratio of 16:9.
Figure 21:
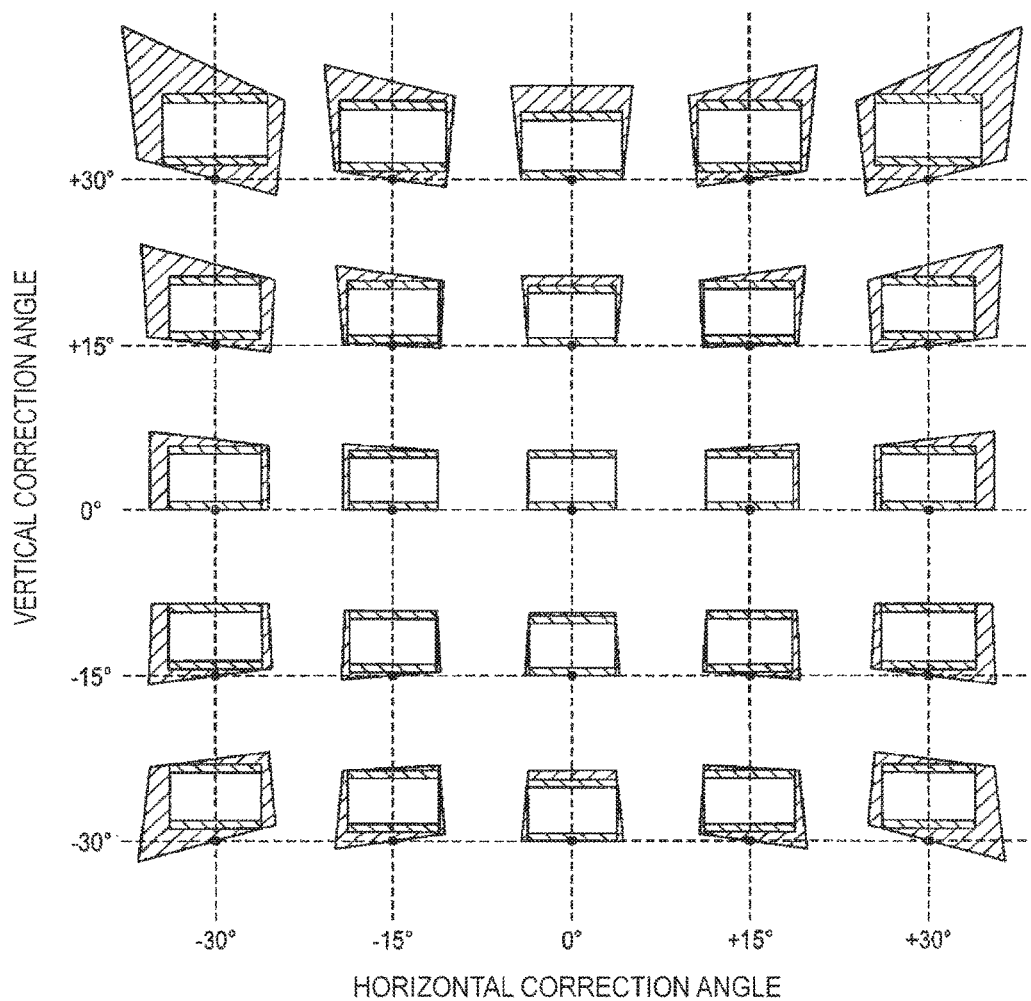
FIG. 21 is a diagram illustrating shapes of quadrangles before and after trapezoid correction on the projection plane and information related thereto according to the related art when an input image has an aspect ratio of 16:9 and the micromirror device has an aspect ratio of 4:3.
Figure 22:
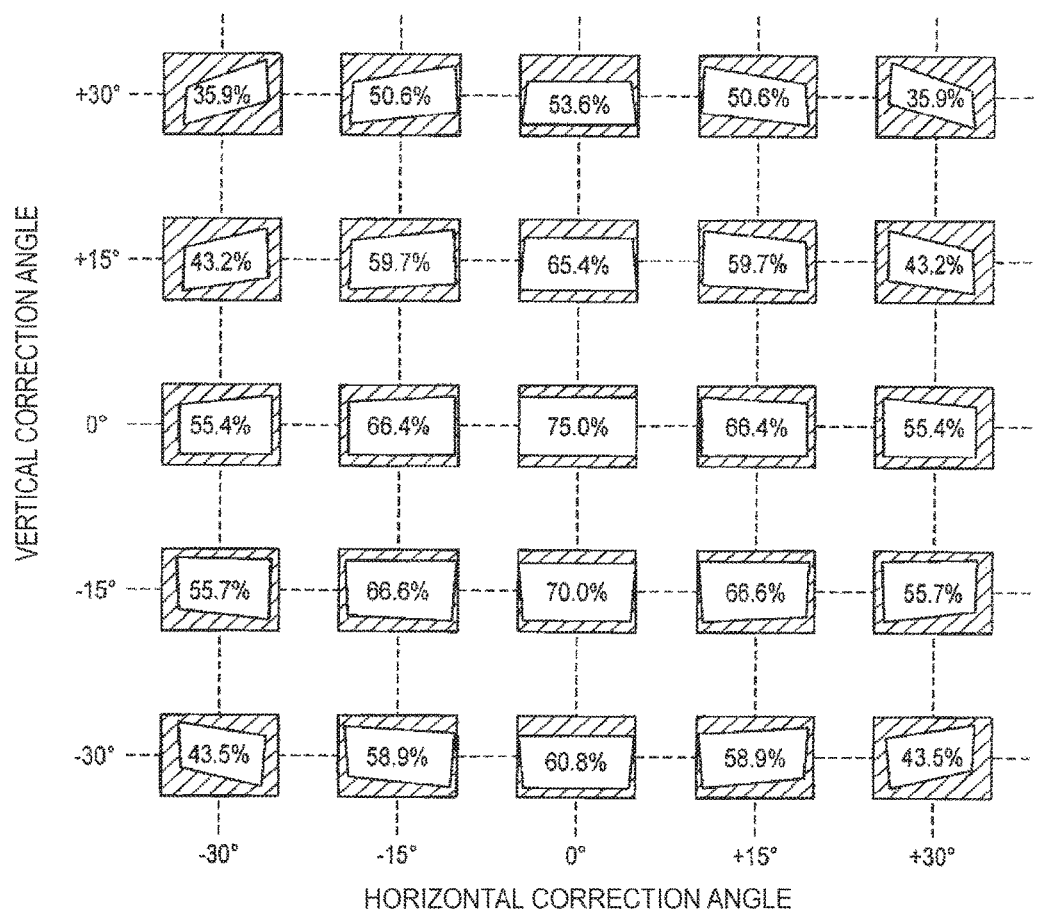
FIG. 22 is a diagram illustrating shapes of quadrangles after trapezoid correction on the micromirror device and information related thereto according to the related art when an input image has an aspect ratio of 16:9 and the micromirror device has an aspect ratio of 4:3.

FIGS. 19 and 20 illustrate cases in which the aspect ratio of the input image is smaller than that of the output display device, that is, the letterboxing is performed, whereas FIGS. 21 and 22 illustrate cases in which the aspect ratio of the input image is larger than that of the output display device, that is, pillarboxing is performed.

FIGS. 19 and 21 illustrate the relations between the projection area and the effective projection area, whereas FIGS. 20 and 22 illustrate the relations between the device area and the effective device area.

In FIGS. 19 and 21, an area shown by hatching extending from upper left to lower right is an ineffective projection area caused by letterboxing or pillarboxing, and an area shown by hatching extending from lower left to upper right is an ineffective projection area caused by trapezoid correction.

In FIGS. 20 and 22, an area corresponding to and combining the two ineffective areas due to different derivations (causes) is shown by hatching.

Optical specification such as the throw ratio and the shift specification are similar to those in the embodiment described above.

As illustrated in FIGS. 19 to 22, the pixel usage is always decreased when trapezoid correction is performed after letterboxing or pillarboxing as compared to when trapezoid correction is not performed (horizontal correction angle: 0°, vertical correction angle: 0°).

In contrast, with the trapezoid correction according to the present embodiment, as described above, the pixel usage may be increased when the trapezoid correction is performed as compared to when the trapezoid correction is not performed.

Thus, with the trapezoid correction according to the present embodiment, the adjustment of the aspect ratios is performed at the same time as the trapezoid correction, which can achieve high pixel usage.

Although examples in which the micromirror device 15 is used as the output display device are described in the present embodiment, the techniques according to the present embodiment can be similarly applied to a projector including another display device such as liquid crystal other than the micromirror device 15.

The present invention is not limited to the embodiment described above but can be modified and embodied in various manners without departing from the scope of the invention in carrying out the invention. Furthermore, the features disclosed in the embodiment described above can be combined as appropriate to make various inventions. For example, if the problems mentioned above can be solved and the advantageous effects of the invention can be produced without some of the features presented in the embodiments, a configuration without the features can be extracted as an invention.

What is claimed is:

1. A projection apparatus comprising:
a projection optical system configured to project projection light having a projection area onto an object;
an output display device having a rectangular device area and being configured to modulate the projection light to generate a projection image; and
a processor which executes a stored program to control operations of:
a comparator configured to compare an aspect ratio of a rectangular input image input as an image to be projected with an aspect ratio of the output display device;
a projection area determination unit configured to determine an effective projection area that is an area included in the projection area and that is rectangular on the object based on a comparison result of the comparator, and configured to perform a shifting operation on the effective projection area to change a position of the effective protection area;
a device area determination unit configured to determine an effective device area so that a relationship between the effective projection area and the projection area corresponds to a relationship between the effective device area and the rectangular device area; and
a geometric transformation unit configured to project the input image onto the effective device area so that the input image is projected without distortion within the effective projection area of the object,
wherein:
in response to the comparator determining that the aspect ratio of the input image is larger than the aspect ratio of the output display device, the processor activates the projection area determination unit to perform the shifting operation such that the effective projection area is shifted toward an intersection of upper and lower sides, where pixel density is high, in a lateral direction, in response to the comparator determining that the aspect ratio of the input image is smaller than the aspect ratio of the output display device, the processor activates the projection area determination unit to determine the effective projection area in accordance with a first horizontal constraint such that an intersection of diagonals of the effective projection area and an intersection of diagonals of the projection area coincide with each other in the lateral direction, and the processor controls the projection area determination unit to perform the shifting operation such that the effective projection area in a vertical direction is shifted downward of the projection area when an optical axis of the projection light deviates downward of the projection area, and is shifted upward of the projection area when the optical axis of the projection light deviates upward of the projection area.

2. The projection apparatus according to claim 1, wherein the projection area determination unit determines the effective projection area so that a proportion of the effective device area in the rectangular device area is high.

3. The projection apparatus according to claim 1, further comprising an obtaining unit configured to obtain a relative angle between the projection light and the object,
wherein the projection area determination unit determines the effective projection area based on the relative angle.

4. The projection apparatus according to claim 3, wherein:
the obtaining unit includes a ranging unit configured to measure a distance to the object, and
the obtaining unit obtains the relative angle based on the distance.

5. The projection apparatus according to claim 3, wherein:
the obtaining unit includes an attitude detector configured to obtain an angle of the projection light with respect to the vertical direction, and
the obtaining unit obtains the relative angle based on the angle.

6. The projection apparatus according to claim 1, wherein:
in response to the comparator determining that the aspect ratio of the input image and the aspect ratio of the output display device are different from each other, the processor activates the projection area determination unit to determine the effective projection area such that the aspect ratio of the effective projection area and the aspect ratio of the input image are equal, and
the geometric transformation unit projects the input image onto the effective device area so that an aspect ratio of an image projected onto the object is the aspect ratio of the input image.

7. A projection method comprising:
a step of comparing an aspect ratio of a rectangular input image input as an image to be projected with an aspect ratio of an output display device having a rectangular device area, the output display device being configured to modulate the projection light which has a projection area and is projected onto an object to generate a projection image;
a step of determining an effective projection area that is an area included in the projection area and that is rectangular on the object based on a comparison result of the step of comparing, and of controlling a shifting operation performed on the effective projection area to change a position of the effective projection area;

a step of determining an effective device area so that a relationship between the effective projection area and the projection area corresponds to a relationship between the effective device area and the rectangular device area; and a step of projecting the input image onto the effective device area so that the input image is projected without distortion within the effective projection area of the object, wherein:
in response to the step of comparing the aspect ratio determining that the aspect ratio of the input image is larger than the aspect ratio of the output display device, the step of determining the effective projection area controls to perform the shifting operation such that the effective projection area is shifted toward an intersection of upper and lower sides, where pixel density is high, in a lateral direction, in response to the step of comparing the aspect ratio determining that the aspect ratio of the input image is smaller than the aspect ratio of the output display device, the step of determining the effective projection area determines the effective projection area in accordance with a first horizontal constraint such that an intersection of diagonals of the effective projection area and an intersection of diagonals of the projection area coincide with each other in the lateral direction, and the step of determining the effective projection area controls to perform the shifting operation such that the effective projection area in a vertical direction is shifted downward of the projection area when an optical axis of the projection light deviates downward of the projection area, and is shifted upward of the projection area when the optical axis of the projection light deviates upward of the projection area.

8. A non-transitory computer readable recording medium having a program stored thereon which is executable to control a computer to perform functions comprising:
comparing an aspect ratio of a rectangular input image input as an image to be projected with an aspect ratio of an output display device having a rectangular device area, the output display device being configured to modulate the projection light which has a projection area and is projected onto an object to generate a projection image;
determining an effective projection area that is an area included in the projection area and that is rectangular on the object based on a comparison result of the comparing, and controlling a shifting operation performed on the effective projection area to change a position of the effective projection area;
determining an effective device area so that a relationship between the effective projection area and the projection area corresponds to a relationship between the effective device area and the rectangular device area; and
projecting the input image onto the effective device area so that the input image is projected without distortion within the effective projection area of the object,
wherein:
in response to the comparing the aspect ratio determining that the aspect ratio of the input image is larger than the aspect ratio of the output display device, the determining the effective projection area controls to perform the shifting operation such that the effective projection area is shifted toward an intersection of upper and lower sides, where pixel density is high, in a lateral direction, in response to the comparing the aspect ratio determining that the aspect ratio of the input image is smaller than the aspect ratio of the output display device, the determining the effective projection area determines the effective projection area in accordance with a first horizontal constraint such that an intersection of diagonals of the effective projection area and an intersection of diagonals of the projection area coincide with each other in the lateral direction, and the determining the effective projection area controls to perform the shifting operation such that the effective projection area in a vertical direction is shifted downward of the projection area when an optical axis of the projection light deviates downward of the projection area, and is shifted upward of the projection area when the optical axis of the projection light deviates upward of the projection area.

* * * * *